United States Patent
Day et al.

(10) Patent No.: US 8,412,700 B2
(45) Date of Patent: Apr. 2, 2013

(54) DATABASE QUERY OPTIMIZATION USING INDEX CARRYOVER TO SUBSET AN INDEX

(75) Inventors: Paul Reuben Day, Rochester, MN (US); Randy L. Egan, Rochester, MN (US); Roger Alan Mittelstadt, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 1112 days.

(21) Appl. No.: 12/013,036

(22) Filed: Jan. 11, 2008

(65) Prior Publication Data

US 2009/0182724 A1    Jul. 16, 2009

(51) Int. Cl.
*G06F 15/16*    (2006.01)
*G06F 17/20*    (2006.01)

(52) U.S. Cl. .................................. 707/715; 707/741

(58) Field of Classification Search .................. 707/745, 707/741, 968, 715
See application file for complete search history.

(56) References Cited

U.S. PATENT DOCUMENTS

| | | | |
|---|---|---|---|
| 5,706,495 | A | 1/1998 | Chadha et al. |
| 6,356,888 | B1 | 3/2002 | Egan et al. |
| 6,405,187 | B1 | 6/2002 | Egan et al. |
| 7,020,647 | B1 | 3/2006 | Egan et al. |
| 2005/0027692 | A1* | 2/2005 | Shyam et al. ............... 707/3 |
| 2006/0041544 | A1* | 2/2006 | Santosuosso ............... 707/4 |

* cited by examiner

*Primary Examiner* — Jean M Corrielus
*Assistant Examiner* — Alex Gofman
(74) *Attorney, Agent, or Firm* — Wood, Herron & Evans LLP

(57) ABSTRACT

A method, apparatus and program product use a first index associated with a field in a database table to identify a range of records in the database table that includes instances of a first key value in the field and use the identified range of records to subset a second index associated with another field in a database table. The database query identifies the first key value for the field in the database table and the second key value for the other field in the database table. By doing so, information from an index may be carried over and applied to another index to subset the other index, often reducing the quantity of entries that are searched in the other index and improving performance.

19 Claims, 5 Drawing Sheets

Table_1

| Field_1 | Field_2 | Field_3 | Field_4 | Field_5 | City Field | Hotel Field | RRN (for reference) |
|---------|---------|---------|---------|---------|------------|-------------|---------------------|
| ... | ... | ... | ... | ... | Austin | Budget Inn | 1 |
| ... | ... | ... | ... | ... | Albert Lea | Budget Inn | 2 |
| ... | ... | ... | ... | ... | Austin | Motor Inn | 3 |
| ... | ... | ... | ... | ... | Austin | Motor Inn | 4 |
| ... | ... | ... | ... | ... | Austin | Budget Inn | 5 |
| ... | ... | ... | ... | ... | Stewartville | Day Inn | 6 |
| ... | ... | ... | ... | ... | Austin | Budget Inn | 7 |
| ... | ... | ... | ... | ... | Austin | Day Inn | 8 |
| ... | ... | ... | ... | ... | Austin | Randy's Inn | 9 |
| ... | ... | ... | ... | ... | Austin | Paul's Inn | 10 |
| ... | ... | ... | ... | ... | Byron | Day Inn | 11 |
| ... | ... | ... | ... | ... | Rochester | Rochester Inn | 12 |
| ... | ... | ... | ... | ... | Austin | Roger's Inn | 13 |
| ... | ... | ... | ... | ... | Austin | Sleepy Inn | 14 |
| ... | ... | ... | ... | ... | Austin | Day Inn | 15 |
| ... | ... | ... | ... | ... | Austin | Econo Inn | 16 |
| ... | ... | ... | ... | ... | Austin | Budget Inn | 17 |
| ... | ... | ... | ... | ... | Byron | Byron Inn | 18 |
| ... | ... | ... | ... | ... | Byron | Motor Inn | 19 |
| ... | ... | ... | ... | ... | Byron | Paul's Inn | 20 |
| ... | ... | ... | ... | ... | Austin | Austin Inn | 21 |
| ... | ... | ... | ... | ... | Austin | Sleep Inn | 22 |
| ... | ... | ... | ... | ... | Austin | Happy Inn | 23 |
| ... | ... | ... | ... | ... | Albert Lea | Albert Lea Inn | 24 |
| ... | ... | ... | ... | ... | Rochester | Day Inn | 25 |

FIG. 4

Encoded Vector Index (EVI) for City Field ~290~

Symbol Table for Table_1

| Key values for City | Byte Coe | First Row | Last Row | Count |
|---|---|---|---|---|
| Albert Lea | 1 | 2 | 24 | 2 |
| Austin | 2 | 1 | 23 | 16 |
| Byron | 3 | 11 | 20 | 4 |
| Rochester | 4 | 12 | 25 | 2 |
| Stewartville | 5 | 6 | 6 | 1 |

300

Vector Table for Table_1

| Byte Code | RRN (for reference) | City Matching Byte Code (for reference) |
|---|---|---|
| Code 2 | 1 | Austin |
| Code 1 | 2 | Albert Lea |
| Code 2 | 3 | Austin |
| Code 2 | 4 | Austin |
| Code 2 | 5 | Austin |
| Code 5 | 6 | Stewartville |
| Code 2 | 7 | Austin |
| Code 2 | 8 | Austin |
| Code 2 | 9 | Austin |
| Code 2 | 10 | Austin |
| Code 3 | 11 | Byron |
| Code 4 | 12 | Rochester |
| Code 2 | 13 | Austin |
| Code 2 | 14 | Austin |
| Code 2 | 15 | Austin |
| Code 2 | 16 | Austin |
| Code 2 | 17 | Austin |
| Code 3 | 18 | Byron |
| Code 3 | 19 | Byron |
| Code 3 | 20 | Byron |
| Code 2 | 21 | Austin |
| Code 2 | 22 | Austin |
| Code 2 | 23 | Austin |
| Code 1 | 24 | Albert Lea |
| Code 4 | 25 | Rochester |

Radix Index for Hotel Field

| Hotel (510) | RRN (520) |
|---|---|
| ... | 1 |
| ... | 2 |
| ... | 3 |
| ... | 4 |
| ... | 5 |
| ... | 6 |
| ... | 7 |
| ... | 8 |
| ... | 9 |
| ... | 10 |
| ... | 11 |
| ... | 12 |
| ... | 13 |
| ... | 14 |
| ... | 15 |
| ... | 16 |
| ... | 17 |
| ... | 18 |
| ... | 19 |
| ... | 20 |
| ... | 21 |
| ... | 22 |
| ... | 23 |
| ... | 24 |
| ... | 25 |

DATABASE QUERY OPTIMIZATION USING INDEX CARRYOVER TO SUBSET AN INDEX

FIELD OF THE INVENTION

The invention relates to computers and computer systems, and in particular, to utilizing indexes to optimize database queries.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL). Database management systems (DBMS's) are the computer programs that are used to access the information stored in the databases and to process searches, or queries, against the databases.

In general, a database query references one or more database tables in a database and includes one or more predicates. Each predicate includes an expression that references a field of a database table and a key value of the database table, and an operator (e.g., equal, etc.). Operators (e.g., AND, etc.) may also be applied to multiple predicates. To execute the query, many DBMS's perform query optimization, in which multiple execution plans or access plans for satisfying the database query are examined to determine the most efficient way to execute the query.

One type of optimization that may be utilized in an access plan includes the use of a database index. A database index is usually built over one or more fields of the database table, and in many cases includes sufficient information about which particular records in a database table likely match a particular predicate without having to retrieve and scan all of the individual records of the database table. One type of index that may be utilized is an encoded vector index ("EVI"). An EVI is a data structure that is made up of two primary components: a symbol table and a vector table. The symbol table contains the distinct key values in the rows of a table covered, as well as statistical information about each key. The statistical information typically includes a numeric byte code identifying the key, the first and last rows of the table where the key is found (i.e., the relative record number (RRN)), and the number of times the key appears in the table (i.e., count). The vector table contains a list of byte codes indicating which key is contained in each row, and as the byte codes are generally in the same ordinal position as the rows in the table, the vector table corresponds to the actual rows in the table. Additionally, the byte codes are often utilized to dynamically create a bitmap index when the database query is run or executed against the table.

Another type of index that may be utilized is a radix index or radix tree index. Radix indexes, like bitmap indexes, typically utilize binary (i.e., 1's and 0's) to indicate the presence of a given key value, with a "1" indicating that the key value is present and a "0" indicating that it is not present. In some systems, radix indexes often have a field, usually a hidden key field as the last key field in the index, that contains the relative record numbers corresponding to the actual rows in the table.

Just as an index in a book facilitates locating information on a specific topic quickly and without blindly paging through the book, database indexes provide similar benefits by providing a method to quickly locate data of interest in a database. In particular, the shorter entries of an index may be quickly searched for data (e.g., a key value) that satisfies the database query, and then the corresponding locations in the database table may be searched to retrieve the results. Thus, only a subset of the database table is searched. Without an index, a DBMS performs a full table scan of the database table, blindly searching through every row in the database table until the target data is located. Depending upon where the data resides in the database table, such a table scan can be a lengthy and inefficient process.

To perform an indexed scan of a database table, techniques such as key selection and key positioning are often utilized on an index. For example, with a radix index, key selection (or a radix index scan) is an operation similar to a table scan in which all of the entries in the index are sequentially processed to identify the key values specified in the database query. Afterwards, the subset of entries from the index that contain the key value may be identified and the corresponding rows in the database table may be searched to retrieve the results for the query. As such, for a given key value, the decision to select or omit an entry from the index to search in the database table is based upon the key value sought.

With key positioning (or radix index probe), only a portion of the index is searched based upon the criteria in the database query. In particular, the structure of the radix index and its collating (i.e., sorted) sequence may be directly probed to find the starting and stopping values of a range of a key value specified in the database query. For example, as the radix index has a sorted collating sequence, if the query references an "x" key value, the range of x's in the index may be probed directly without having to scan the entire radix index as with key selection. The subset of entries from the radix index that contain the given key value may be searched in the database table to retrieve the results for the query.

Indexes have traditionally been utilized individually. For example, during typical query optimization, an index built over a field or an index built over multiple fields may be selected for an execution plan. After selection of the index, key selection or key positioning may be applied to the selected index and the database query may be executed to retrieve the results. No information is typically shared between two or more indexes, except for maybe estimate information or RRN information.

However, as the reliance on information increases, both the volume of information stored in most databases, as well as the number of users wishing to access that information, likewise increases. Moreover, as the volume of information in a database, and the number of users wishing to access the database increases, the amount of computing resources required to manage such a database increases as well. Thus, new ways to use database indexes, which often require many system resources to build, are needed in order to continue to provide significant improvements in query performance; otherwise, database users will be hampered in their ability to maximize intelligent information retrieval.

BRIEF SUMMARY OF THE INVENTION

The invention addresses these and other problems associated with the prior art by providing a program product, an apparatus, and a method that use a first index associated with a field in a database table to identify a range of records in the database table that includes instances of a first key value in the field and use the identified range of records to subset a second index associated with another field in the database table. The database query identifies the first key value for the field in the database table and the second key value for the other field in the database table. By doing so, information from an index may be carried over and applied to another index to subset the other index, often reducing the quantity of entries that are searched in the other index and improving performance.

Embodiments consistent with the principles of the present invention may process a database query that identifies a first key value for a field in a database table and a second key value for another field in the database table by using a first index associated with the field in the database table to identify a range of records in the database table that includes instances of the first key value in the field and using the identified range of records to subset a second index associated with the other field in the database table.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE SEVERAL VIEWS OF THE DRAWINGS

FIG. 4 is an example of selected fields from a relational database table suitable for utilizing index carryover consistent with the invention.

FIG. 5 is an example of an encoded vector index (EVI) built over a field of the relational database table of FIG. 4.

FIG. 6 is an example of a radix tree index built over a field of the relational database table of FIG. 4.

DETAILED DESCRIPTION OF THE INVENTION

Embodiments consistent with the invention utilize index carryover to subset one index with information from another index during processing of a database query. Embodiments consistent with the invention typically process a database query that specifies key values for multiple fields in a particular database table, and during processing of the query, a first index associated with one of the fields in the database table is used to identify a range of records in the database table that includes instances of a key value specified in the database query. The identified range of records is then used to subset a second index associated with another field in the database table, and thus reduce the field of search for the second index during execution of the query.

Figure 1:
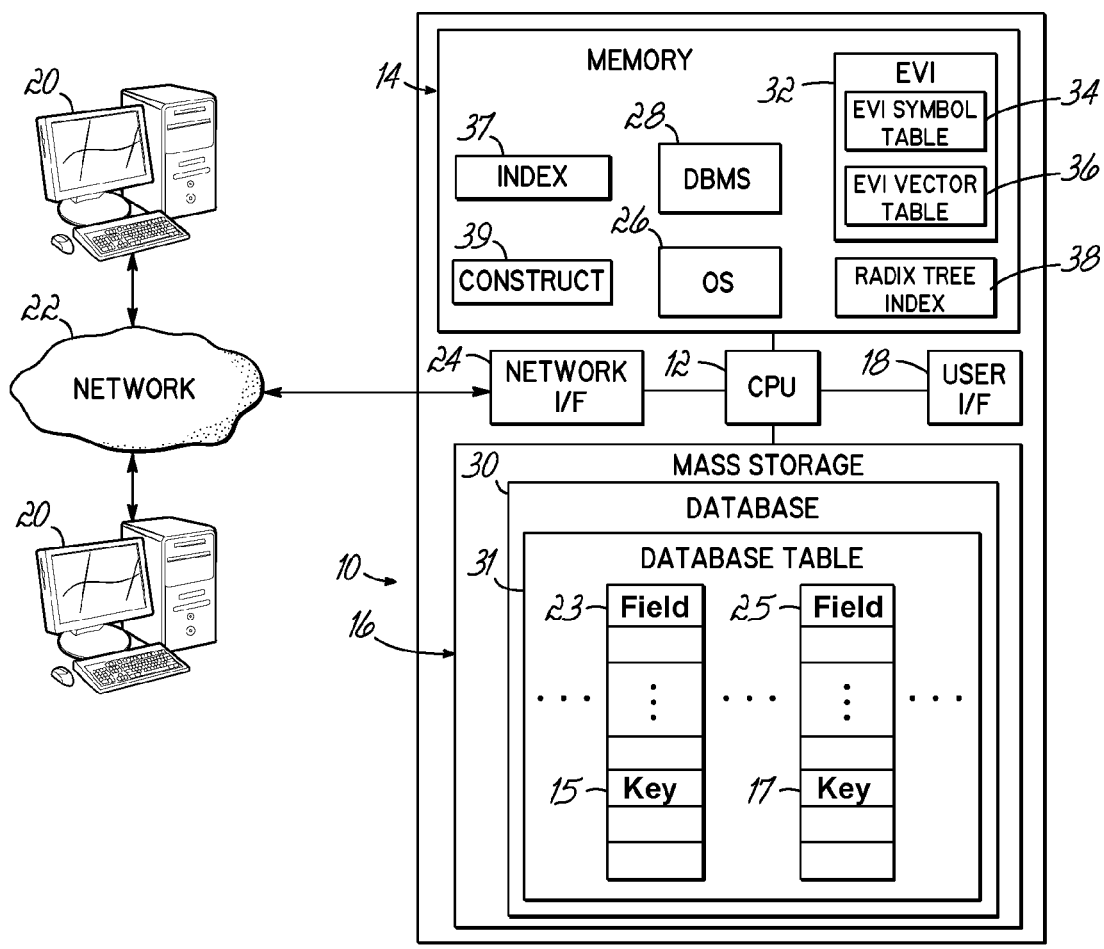
FIG. 1 is a block diagram of a networked computer system incorporating a database management system within which is implemented query optimization with index carryover consistent with the invention.

Turning now to the Drawings, wherein like numbers denote like parts throughout the several views, FIG. 1 illustrates an exemplary hardware and software environment for an apparatus 10 suitable for implementing a database management system incorporating query optimization with index carryover consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

In the context of the invention, at least one EVI 32 and/or at least one radix tree index 38 may be resident in memory 14. EVI 32 may include a symbol table 34 and a vector table 36. Also resident in memory 14 may be at least one index 37 and/or at least one construct 39. Index 37 may be practically any index that contains information about key values identified in database query 46 and information about records in database table 31 located in database 30 that include instances of the key values. Similarly, construct 39 may be practically any construct that contains information about key values identified in database query 46 and information about records in database table 31 that include instances of the key values. Construct 39 need not be a formal index; instead, construct 39 may be a proprietary structure, file structure, etc. EVI 32, radix index or radix tree index 38, construct 39, and/or index 37 may be associated with (e.g., built over) fields 23, 25 of database table 31. In the context of the invention, "index" or "indexes" may be any one of these indexes or structures.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Database 30 may have at least one database table 31 and each database table may have at least one field containing key values. Multiple key values may be present in a field, including multiple instances of a single key value. As illustrated, database table 31 has a field 23 and a field 25, which have at least one key value each, such as key values 15, 17, respectively. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
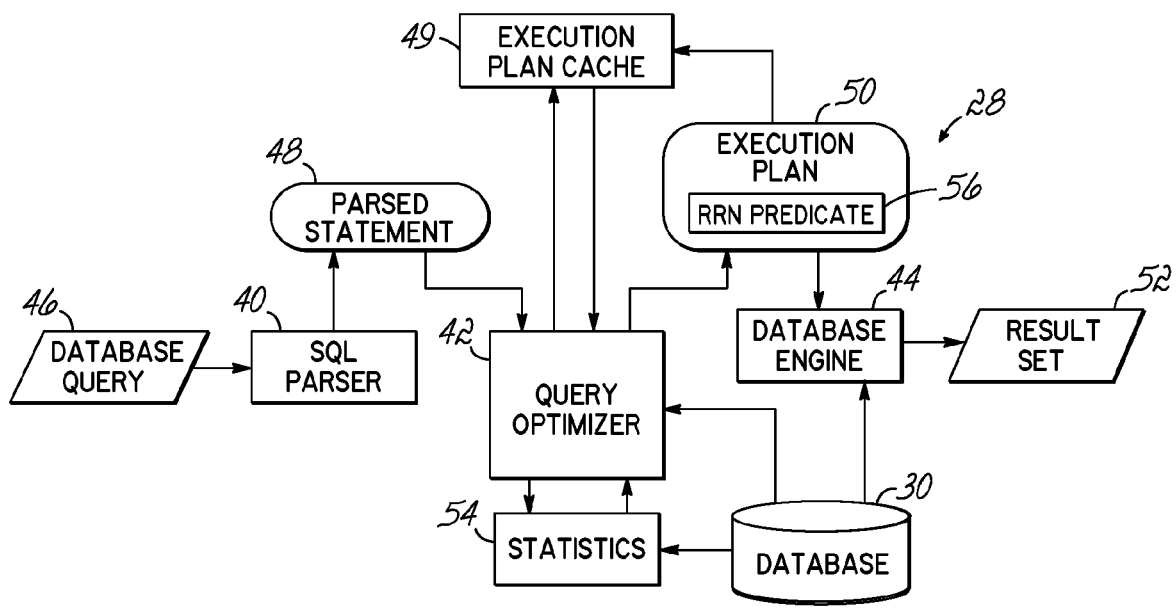
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution plan or access plan 50 is generated. Execution plan 50 may have a RRN predicate 56, which may be created by query optimizer 42 from an index (e.g., EVI 32) and/or from indexes (e.g., EVI 32 and radix tree index 38, and Index 37, and Construct 39, etc.).

Once generated, the execution plan is forwarded to execution plan cache 49 to be stored for future use and to database engine 44 for execution of the database query on the information in database 30. The result of the execution of the database query is typically stored in a result set, as represented at block 52. To facilitate the optimization of queries, the DBMS 28 may also include statistics 54, which may be statistical information that is gathered, created, and/or analyzed using database 30 for query optimizer 42.

In the context of the invention, a database query 46 may be received for processing by DBMS 28. Database query 46 may identify a key value 15 for field 23 in database table 31 and a key value 17 for field 25 in database table 31. Query optimizer 42 may utilize an index associated with a field 23 to identify a first range of records in database table 31 that includes instances of key value 15 in field 23. The range of records may be a range of relative record numbers. Next, query optimizer 42 may generate a RRN predicate 56 based on the identified range of records and may add RRN predicate 56 to execution plan 50. Database engine 44 may then utilize execution plan 50 to execute database query 46. In executing the query, database engine 44 may use RRN predicate 56 to subset the index associated with field 25. Thus, although the indexes are associated with different fields, a predicate may be created to subset the index, reducing the quantity of entries of the index that are searched during execution of the query when key positioning, key selection, or other conventional technique are performed on the index.

In the context of the invention, query optimizer 42 may also utilize the index associated with field 25 to identify a second range of records in database table 31 that include instances of key value 17 in field 25. The second range of records may be combined by query optimizer 42 with the first range of records identified from the index associated with field 23 to generate a composite range of records. As such, RRN predicate 56 may be based upon the composite range of records and may be utilized to execute database query 46 as generally described above. Those of ordinary skill in the art may appreciate that by creating the RRN predicate from the composite range, the quantity of entries of the index associated with field 25 may be subset to reduce the quantity of entries that are searched during execution of the query when key positioning, key selection, and/or other conventional techniques are performed.

Moreover, those of ordinary skill in the art may appreciate that the more indexes that are utilized, the smaller the subset may be and the greater the reduction of entries of the index that will be searched when performing key positioning, key selection, or other conventional technique on the index in executing the database query. Specifically, there may be many indexes on any given table, with a mixture of EVI's, radix tree indexes, other indexes and constructs, and a variety of database queries against a table or a set of tables. Nonetheless, the principles of the present invention may be applied to automatically search all of the applicable indexes and dynamically carry over information from one applicable index to another applicable index based upon the query to improve key positioning and/or key selection between the multiple applicable indexes.

Despite the exemplary system illustrated in FIG. 1 and the exemplary implementation of DBMS 28 illustrated in FIG. 2, these are not intended to limit the present invention. Indeed, those skilled in the art will recognize that other alternative hardware and/or software environments may be used without departing from the scope of the invention. For example, different functionality than that described herein may be accorded to the components consistent with the principles of the present invention.

Figure 3:
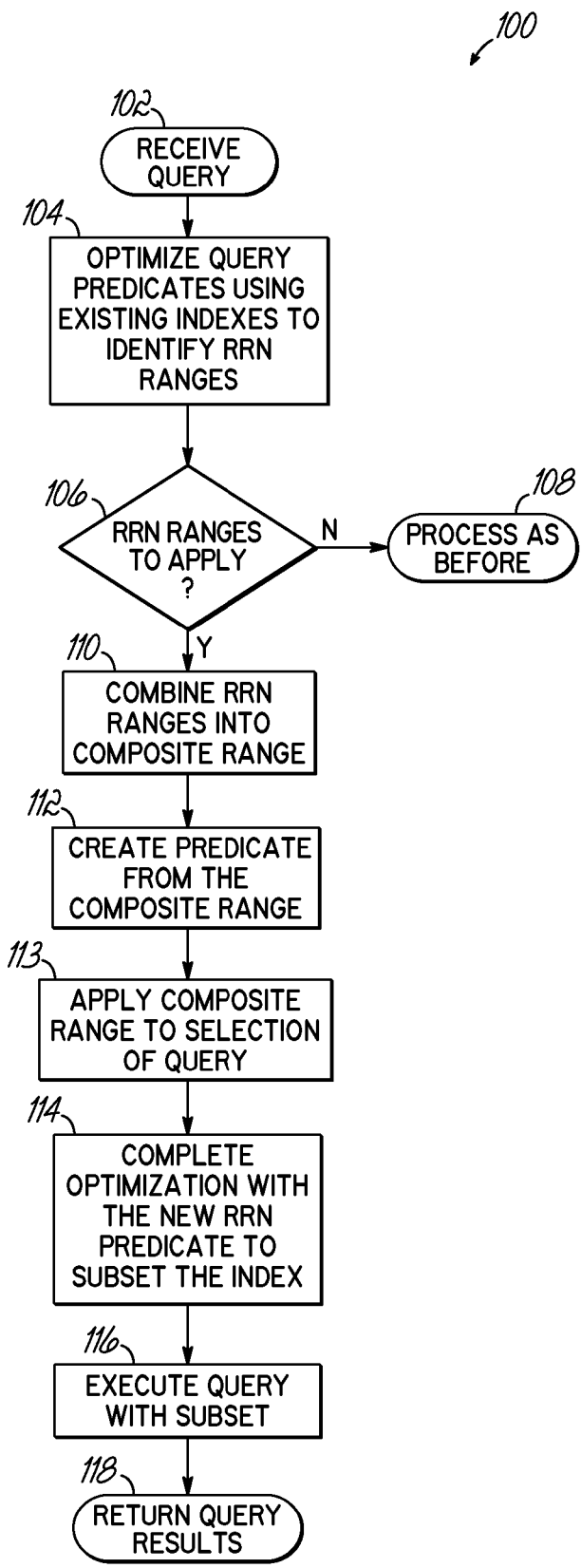
FIG. 3 is a flowchart illustrating the program flow of one implementation of a query optimization routine executed in the database management system of FIG. 1.

Turning to FIG. 3, FIG. 3 is a flow chart of a query optimization routine 100 where a range of records (i.e., RRN range) identified from an index is carried over and utilized to subset another index. Exemplary routine 100 will discuss the identification of multiple ranges of records (i.e., multiple RRN ranges) from multiple indexes to be combined and utilized to subset an index. However, those of ordinary skill in the art will appreciate that a single range of records may be identified from an index and utilized to subset another index consistent with the principles of the present invention.

Starting with block 102, a database query may be received for processing from a user and the predicates of the received database query may be optimized using the existing indexes to identify the RRN ranges in block 104. Specifically, the predicates in the database query may be analyzed to determine the fields and key values that are being referenced, and the operators that are being utilized. The operators may be within a predicate (e.g., equal, more than, less than, etc.) or between predicates (e.g., AND, OR, etc.). The database query may also be analyzed to determine if at least two fields are being referenced in the predicates and whether the predicates contain equal operators.

Moreover, the query may be analyzed to determine if the referenced fields are associated with separate indexes. As some of the existing indexes may be associated with other fields that are not referenced in the received query, the existing indexes may be analyzed to determine if they are associated with the fields that are referenced by the database query. The RRN ranges may be identified from the indexes that are associated by using the key values in the indexes to obtain the RRN information.

Next, block 106 determines if there are any RRN ranges to apply. Whether or not there are any RRN ranges to apply may depend upon the existing indexes, the predicates in the database query, the operators in the database query, etc. For example, if there are no indexes or if none of the existing indexes are associated with the fields referenced in the database query, then a RRN range cannot be identified from the existing indexes and there may be no RRN range to apply. Moreover, as many indexes typically include RRN information indicative of rows that contain or are likely to contain a certain key value as opposed to RRN information indicative of rows with key values above or below a certain value, there may be no RRN range to apply if the operators in the predicates of the database query are other than equal operators (i.e., =). However, those of ordinary skill in the art will appreciate that if such RRN information is collected, the principles of the present invention may be applied.

Additionally, if there is already a single index associated with all the fields referenced in the database query, then it may not be advantageous to identify a RRN range to apply. Those of ordinary skill in the art may appreciate that the principles of the present invention are preferably utilized when there are multiple indexes associated with multiple fields referenced in the database query, in other words, when there is no single index associated with the fields. If there is a single index associated with the fields referenced in the database query, then that single index may be utilized without further subsetting. For example, if a query references field_a and field_b, and there is an index_a associated with field_a and an index_b associated with field_b, further subsetting of index_b may be advantageous. However, it may not be advantageous if index_b is already associated with both field_a and field_b. In some embodiments though, the principles of the present invention may be utilized to further subset the single index.

If there are no RRN ranges to apply, control passes to block 108 to process the database query as before or as conventionally processed. If there are RRN range to apply, control passes to block 110 to combine the RRN ranges into a composite range. The operations (e.g., And, OR, etc.) between the predicates of the database query may be utilized to combine the ranges.

For example, in the context of multiple EVI's, the RRN's in the composite range may be limited with the "AND" operation whereas with an "OR" operation, the composite range will be more expansive than with an "AND" operation. In particular, with the "AND" operation, only the records that are common to the identified RRN ranges may be included in the composite range because the database query needs to be satisfied with records in the database table that have matching RRN's. The minimum RRN value may be the largest first row value found in the applicable EVI's and the maximum RRN value may be the smallest last row value found in the applicable EVI's. On the other hand, the composite range may include all the records in the identified RRN ranges if there is an "OR" operation because the database query may be satisfied with records in the database table that have any of the requisite key values. The minimum and maximum RRN values for "OR" operations may be the opposite of those for "AND" operations.

Next, a predicate may be created from the composite range in block 112. The predicate may be in the form of RRN(Table Name) between RRN# and RRN#. Next, the predicate may be added to the database query in block 113 so as to apply the composite range to the selection of the database query.

Optimization may be completed with the new RRN predicate in block 114. In particular, the execution plan may be generated and will include the predicate, which will be utilized to subset the index. Next, control passes to block 116 to execute the database query with the subset. The index may be subset dynamically during execution and key positioning, key selection, and/or other conventional technique may be applied to subset the index. The query results are returned to the user in block 118.

Turning now to FIGS. 4, 5, and 6, these figures represent an example illustrating the processing of an exemplary query on an exemplary table using the query optimization routine of FIG. 3. In particular, these figures illustrate City Field 260 and a Hotel Field 270 of relational database Table_1 200 (FIG. 4), an encoded vector index (EVI) 290 built over the City Field 260 (FIG. 5), and a radix tree index 500 built over the Hotel Field 270 (FIG. 6). EVI 290 includes a symbol table 300 and a vector table 400 (FIG. 5).

To facilitate the discussion of the example, in FIG. 5, a RRN column 420 and a city matching byte code column 430 are illustrated in EVI 290 for reference in phantom, although the byte code column 410 may be the only column in vector table 400. The RRN values in the RRN column 420 are implied by the ordinal position of the byte code column 410 in vector table 400, and as such, no separate column is typically required to store this information. The RRN's correspond to the row numbers in Table_1 200 over which EVI 290 is built. The city that matches the byte code column 430 is defined by the byte code in symbol table 300. Radix index 500 in FIG. 6 may also optionally include a hidden RRN key field 520 as the last key field in the index.

Returning to the example, a query such as Query_1 may be received from a user.

---
Query_1
---
Select *
From Table_1 A
Where City = 'Byron' and Hotel = 'Motor Inn'
---

From the first row column 330 and the last row column 340 of EVI 290 (FIG. 5), which are associated with City Field 260 in FIG. 4, it is evident that all of the values of Byron are between RRN's 11 and 20 in Table_1 200 (FIG. 4). As such, EVI 290 may be used to identify a range of records from 11 to 20 and the identified range of records may be used to subset radix index 500 in FIG. 6. A predicate such as "RRN(A) between 11 and 20" may be created from the identified RRN range and may be added to Query_1. Query_2 illustrates Query_1 after the addition of the predicate.

---
Query_2
---
Select *
From Table_1 A
Where City = 'Byron' and Hotel = 'Motor Inn' and RRN(A) between 11 and 20
---

Even though EVI 290 (FIG. 5) and radix index 500 (FIG. 6) are each built over different fields of Table_1 200 (FIG. 4), and the indexes have no relationship, the query optimizer may use the information in EVI 290 for Byron. Specifically, the optimizer may identify the RRN range and apply that selection criteria to Hotel due to the "AND" operator between the two predicates of Query_1 because any value for Hotel must also match Byron. Therefore, RRN range 11 to 20 may be applied to subset radix index 500. Next, during query execution, radix index 500 may be subset with the predicate and key positioning, key selection, and/or other conventional technique may be performed on the smaller subset of RRN 11 to 20 of radix index 500.

Those of ordinary skill in the art may appreciate that although radix index 500 (FIG. 6) only exists over the Hotel Field 270, information from EVI 290 over the City Field 260 may be utilized to implicitly apply extra selection (e.g., key positioning selection) to the Hotel Field even though the radix index 500 does not have a City Field. In particular, RRN information stored in an EVI for each key value (byte code) may be utilized to create key positioning and/or key selection ranges concurrently for an unrelated index, which may speed up processing for radix tree indexes. Furthermore, the highest and lowest values of RRN's for a given key value may be selected from an EVI and applied to a radix index so that the keys to be examined in the radix index for selection can be further subsetted using key positioning, key selection, or other methods. Thus, implementation information may be supplied to a particular index to improve performance.

Alternatively, radix index 500 (FIG. 6) over the Hotel Field may be also utilized to further subset. In particular, radix index 500 may be used to identify another range of RRN's corresponding those in Table 1 200 (FIG. 4) that contain or are likely to contain Motor Inn, the other key value referenced in Query_1. Motor Inn may be found in Table_1 200 in RRN range 3 to 19. This identified range from the radix index may then be combined with the identified range from the EVI to create a composite range of 11 to 19. The composite range will include the RRN's that are common to both identified ranges because of the "AND" operator. A predicate may also be created from the composite range and added to the query. Query_3 illustrates the addition of the predicate of the composite range.

---
Query_3
---
Select *
From Table_1 A
Where City = 'Byron' and Hotel = 'Motor Inn' and RRN(A) between 11 and 19
---

This narrower predicate may be utilized instead of the predicate in Query_2 to further subset radix index 500 (FIG. 6). As such, the number of entries in radix index 500 on which to apply key positioning, key selection and/or some other conventional technique may be further reduced to the smaller RRN range of 11 to 19. In other words, key positioning may be performed on the Hotel criteria from Query_1 and the RRN information from EVI 290 for Byron (i.e., RRN between 11 to 20).

Next, during query execution, radix index 500 may be subset with the predicate created from the composite range and key positioning, key selection, and/or other conventional technique may be performed on the smaller subset of RRN 11 to 19 of radix index 500. This smaller subset of radix index 500 may then be searched and utilized to search Table_1 to execute the database query, resulting in improved performance.

Those of ordinary skill in the art will appreciate that the information in this example was applied from an EVI to a radix index, however, information may be applied from an EVI to an EVI, from a radix index to a radix index, etc. Those of ordinary skill in the art will also appreciate that if a third applicable index (or a fourth applicable index, n-th applicable index, etc.) was available over the City Field or the Hotel Field (or any other field specified in a query), an RRN range may be identified from this third index and utilized to further subset radix index 500. It should be appreciated that practically any mixture and quantity of EVI's, radix tree indexes, other indexes, constructs, etc. may be utilized consistent with the principles of the present invention.

In addition, while the above example is greatly simplified for ease of understanding, it will be appreciated that the performance gains that can be obtained in many environments can be substantial. As another example, consider a database query performed on a table of employee information that contains 500,000 records, where the table includes indexes over both a last name field and a division field. Consider also a database query searching for all employees with a last name of "Johnson" who work in the "Global Widget"

division, and that there are approximately 150 employees company-wide with a last name of "Johnson," but that the "Global Widget" division has 250,000 employees worldwide. If the index over the last name field is used to identify a range of records for the last name of "Johnson", the identified range might be dispersed over a relatively small range, e.g., records 175,000 to 200,000. In contrast, due to the large number of employees in the "Global Widget" division, the range of records matching this key value in the division index would be relatively large, e.g., records 50,000 to 425,000. Consequently, performing a probe or scan of the division index would still require a relatively computationally expensive operation of processing at least 375,000 entries in the index. However, from the last name index it is known that matching records for the query will have to come from the records between 175,000 and 200,000, so this information can be used to subset for the division index to 175,000 to 200,000, and reducing the overall search space for the division index from 375,000 entries to 25,000 entries.

Those of ordinary skill in the art may appreciate that via the principles of the present invention, information from an index may be dynamically carried over to another index during the running of the query and utilized for applying key positioning, key selection, or other conventional to another index. Moreover, the query optimizer may be better able to leverage existing indexes across many queries and improve performance without customer assistance or intervention.

Various modifications may be made to the illustrated embodiments without departing from the spirit and scope of the invention. Therefore, the invention lies in the claims hereinafter appended.

What is claimed is:

1. A method for processing a database query, wherein the database query identifies a first key value for a field in a database table and a second key value for another field in the database table, the method comprising:
    using a first index associated with the field in the database table to identify a range of records in the database table that includes instances of the first key value in the field;
    creating a predicate from the identified range of records;
    using the identified range of records to subset a second index associated with the other field in the database table by subsetting the second index with the predicate, wherein the first and second indexes are built over different fields of the same database table, wherein each of the first and second indexes covers all of the records of the database table, wherein the field and the other field are identified in the database query, and wherein subsetting the second index further comprises using the second index associated with the other field in the database table to identify a second range of records in the database table that includes instances of the second key value in the other field; and
    generating a composite range of records based upon the first and second ranges of records, wherein generating the composite range of records comprises combining the first range of records from the first index and the second range of records from the second index based upon at least one operation in the database query.

2. The method of claim 1, wherein the database query includes an OR operation, and wherein the composite range of records includes all record numbers in the first range of records from the first index and the second range of records from the second index.

3. The method of claim 1, wherein the database query includes an AND operation, and wherein the determined range of records includes record numbers that are common to both the first range of records from the first index and the second range of records from the second index.

4. The method of claim 1, further comprising creating a predicate from the composite range of records to be added to the database query to modify selection of the database query.

5. The method of claim 4, further comprising subsetting the second index with the added predicate.

6. The method of claim 4, further comprising executing the database query with the added predicate.

7. The method of claim 1, wherein subsetting of the second index further comprises performing at least one of a key positioning operation or a key selection operation.

8. The method of claim 1, wherein the first index is an encoded vector index and the second index is a radix tree index.

9. The method of claim 1, wherein the first index is a radix tree index and the second index is a radix tree index.

10. The method of claim 1, wherein the first index is an encoded vector index and the second index is an encoded vector index.

11. The method of claim 1, further comprising using at least one other index to subset the second index.

12. The method of claim 1, wherein at least one of the first index or the second index is a construct that includes information about key values identified in the database query and information about records in the database table that include instances of the key values.

13. The method of claim 1, wherein the first index is an encoded vector index, and wherein identifying the range of records further comprises accessing a symbol table entry for the key value in a symbol table in the encoded vector index.

14. An apparatus comprising:
    a processor,
    a memory; and program code resident in the memory and configured to be executed by the processor to process a database query, wherein the database query identifies a first key value for a field in a database table and a second key value for another field in the database table, by using a first index associated with the field in the database table to identify a range of records in the database table that includes instances of the first key value in the field and using the identified range of records to subset a second index associated with the other field in the database table, wherein the program code is further configured to create a predicate from the identified range of records and subset the second index with the predicate, wherein the first and second indexes are built over different fields of the same database table, wherein each of the first and second indexes covers all of the records of the database table, wherein the field and the other field are identified in the database query, wherein the program code is further configured to subset the second index by using the second index associated with the other field in the database table to identify a second range of records in the database table that includes instances of the second key value in the other field, wherein the program code is further configured to generate a composite range of records based upon the first and second ranges of records, wherein the program code is further configured to generate the composite range of records by combining the first range of records from the first index and the second range of records from the second index based upon at least one operation in the database query.

15. The apparatus of claim 14, wherein the program code is further configured to create a predicate from the composite range of records to be added to the database query to modify selection of the database query.

16. The apparatus of claim 15, wherein the program code is further configured to subset the second index with the added predicate.

17. The apparatus of claim 14, wherein the program code is further configured to subset the second index by performing at least one of a key positioning operation or a key selection operation.

18. The apparatus of claim 14, wherein the program code is further configured to use at least one other index to subset the second index.

19. A program product, comprising: program code configured to process a database query, wherein the database query identifies a first key value for a field in a database table and a second key value for another field in the database table, by using a first index associated with the field in the database table to identify a range of records in the database table that includes instances of the first key value in the field and using the identified range of records to subset a second index associated with the other field in the database table, wherein the program code is further configured to create a predicate from the identified range of records and subset the second index with the predicate, wherein the first and second indexes are built over different fields of the same database table, wherein each of the first and second indexes covers all of the records of the database table, wherein the field and the other field are identified in the database query; wherein the program code is further configured to subset the second index by using the second index associated with the other field in the database table to identify a second range of records in the database table that includes instances of the second key value in the other field, wherein the program code is further configured to generate a composite range of records based upon the first and second ranges of records, wherein the program code is further configured to generate the composite range of records by combining the first range of records from the first index and the second range of records from the second index based upon at least one operation in the database query, and a non-transitory computer readable medium storing the program code.

* * * * *